(12) United States Patent
Sands et al.

(10) Patent No.: US 10,273,019 B2
(45) Date of Patent: Apr. 30, 2019

(54) DISTRIBUTED PROPULSION SYSTEM POWER UNIT CONTROL

(71) Applicants: Rolls-Royce Corporation, Indianapolis, IN (US); Rolls-Royce North American Technologies, Inc., Indianapolis, IN (US)

(72) Inventors: Jonathan S. Sands, Clayton, IN (US); Ryan C. Humes, Indianapolis, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 29 days.

(21) Appl. No.: 15/450,990

(22) Filed: Mar. 6, 2017

(65) Prior Publication Data
US 2018/0251228 A1 Sep. 6, 2018

(51) Int. Cl.
 B64D 35/08 (2006.01)
 B64D 31/06 (2006.01)
 (Continued)

(52) U.S. Cl.
 CPC ............ B64D 35/08 (2013.01); B63H 23/12 (2013.01); B64D 27/02 (2013.01); B64D 27/24 (2013.01);
 (Continued)

(58) Field of Classification Search
 CPC ........ B64D 35/04; B64D 35/08; B64D 31/06; B60K 5/08; B63H 23/10; B63H 23/12;
 (Continued)

(56) References Cited

U.S. PATENT DOCUMENTS 2,319,169 A * 5/1943 Tampier ................. B64D 27/00 244/60
2,723,531 A * 11/1955 Wosika .................. B64D 41/00 244/55

(Continued)

FOREIGN PATENT DOCUMENTS

DE 3741891 A1 * 6/1989 ............... B60K 5/08
DE 19520759 A1 * 12/1996 ............. B63H 23/14
(Continued)

OTHER PUBLICATIONS

Epstein, "Distributed Propulsion: New Opportunities for an Old Concept," Gas Turbine Laboratory, Department of Aeronautics and Astronautics, Massachusetts Institute of Technology, Final Technical Report, Dec. 2007, 41 pp.
(Continued)

Primary Examiner — Behrang Badii
Assistant Examiner — David A Testardi
(74) Attorney, Agent, or Firm — Shumaker & Sieffert, P.A.

(57) ABSTRACT

A propulsion system that includes a plurality of power units, a plurality of propulsors, where respective power units of the plurality of power units are controllably coupled to the plurality of propulsors, and a controller configured to receive a desired throttle value corresponding to a desired propulsive force, determine a number of power units of the plurality of power units to be coupled to the plurality of propulsors to achieve the desired propulsive force based on a respective power value associated with each respective power unit of the plurality of power units, and cause the number of power units of the plurality of power units to be coupled to the plurality of propulsors.

20 Claims, 7 Drawing Sheets

(51) Int. Cl.
*B63H 23/12* (2006.01)
*B64D 31/00* (2006.01)
*F02B 63/04* (2006.01)
*F01D 15/10* (2006.01)
*F01D 15/12* (2006.01)
*F01D 21/00* (2006.01)
*B64D 27/24* (2006.01)
*B64D 35/04* (2006.01)
*F02D 25/04* (2006.01)
*B64D 27/02* (2006.01)
*B64D 31/14* (2006.01)

(52) U.S. Cl.
CPC ............. *B64D 31/00* (2013.01); *B64D 31/06* (2013.01); *B64D 31/14* (2013.01); *B64D 35/04* (2013.01); *F01D 15/10* (2013.01); *F01D 15/12* (2013.01); *F01D 21/003* (2013.01); *F02B 63/04* (2013.01); *F02D 25/04* (2013.01); *B64D 2027/026* (2013.01); *F05D 2220/32* (2013.01)

(58) Field of Classification Search
CPC ......... B63H 23/14; B63H 23/16; F02D 25/04; F02B 73/00; F01D 13/00; F01D 13/003
See application file for complete search history.

(56) References Cited

U.S. PATENT DOCUMENTS

| | | | | |
|---|---|---|---|---|
| 3,115,936 A * | 12/1963 | Blews, Jr. | ............. | B64D 35/04 416/120 |
| 3,391,745 A * | 7/1968 | Svensson | ............. | B63H 23/18 416/130 |
| 3,869,862 A * | 3/1975 | Dickey | ............. | F02C 6/02 244/17.11 |
| 4,188,837 A * | 2/1980 | Bendall | ............. | B63H 23/18 440/75 |
| 4,311,472 A * | 1/1982 | Hiersig | ............. | B63H 23/10 114/269 |
| 4,344,760 A * | 8/1982 | Kulikowski | ............. | B63H 23/18 440/3 |
| 4,351,635 A * | 9/1982 | Staedeli | ............. | B63H 23/12 440/75 |
| 4,442,805 A * | 4/1984 | Yamakawa | ............. | F02B 73/00 123/198 F |
| 6,474,068 B1 * | 11/2002 | Abdel Jalil | ............. | B60K 5/08 180/65.1 |
| 6,862,511 B1 * | 3/2005 | Phillips | ............. | B60K 5/08 701/54 |
| 7,104,499 B1 | 9/2006 | Arata | | |
| 7,244,154 B1 * | 7/2007 | Connell | ............. | B63H 23/06 440/75 |
| 7,364,118 B2 * | 4/2008 | Knott | ............. | B64C 21/025 244/73 R |
| 8,395,274 B2 | 3/2013 | Nelson et al. | | |
| 9,096,312 B2 | 8/2015 | Moxon | | |
| 2004/0172946 A1 * | 9/2004 | Gray, Jr. | ............. | B60K 5/08 60/698 |
| 2005/0023058 A1 * | 2/2005 | Gebby | ............. | F02D 11/105 180/69.6 |
| 2005/0126173 A1 * | 6/2005 | Anderson | ............. | B60K 5/08 60/698 |
| 2007/0142166 A1 * | 6/2007 | Gebby | ............. | B60W 10/06 477/15 |
| 2008/0006739 A1 * | 1/2008 | Mochida | ............. | B64C 27/04 244/60 |
| 2009/0097959 A1 | 4/2009 | Vos et al. | | |
| 2009/0145998 A1 | 6/2009 | Salyer | | |
| 2011/0015034 A1 * | 1/2011 | Ehinger | ............. | B64C 27/08 477/70 |
| 2012/0209456 A1 | 8/2012 | Harmon et al. | | |
| 2013/0086919 A1 * | 4/2013 | Dooley | ............. | F02C 7/26 60/778 |
| 2013/0110375 A1 * | 5/2013 | Gunewardena | ............. | F02B 73/00 701/102 |
| 2013/0219905 A1 * | 8/2013 | Marconi | ............. | F02C 6/206 60/772 |
| 2014/0145028 A1 * | 5/2014 | Gomez | ............. | B64C 27/12 244/58 |
| 2014/0159371 A1 | 6/2014 | Hugo et al. | | |
| 2015/0144742 A1 | 5/2015 | Moxon | | |
| 2015/0284071 A1 | 10/2015 | Veilleux, Jr. et al. | | |
| 2015/0311832 A1 | 10/2015 | Solodovnik et al. | | |
| 2015/0367950 A1 | 12/2015 | Rajashekara et al. | | |
| 2015/0375860 A1 * | 12/2015 | Hong | ............. | B64D 35/00 244/12.4 |
| 2016/0355272 A1 | 12/2016 | Moxon | | |
| 2018/0080378 A1 * | 3/2018 | Alecu | ............. | F02C 6/02 |

FOREIGN PATENT DOCUMENTS

| | | | | |
|---|---|---|---|---|
| DE | 10000667 A1 * | 7/2001 | ............. | B63H 23/14 |
| EP | 2801719 A1 | 11/2014 | | |
| GB | 2497136 A | 6/2013 | | |
| GB | 2497136 A1 * | 6/2013 | | |
| WO | 2013079972 A1 | 6/2013 | | |
| WO | 2014158240 A2 | 10/2014 | | |
| WO | WO-2014203053 A1 * | 12/2014 | | |

OTHER PUBLICATIONS

Englar, "Pneumatic Aerodynamic/Propulsive Concepts for Distributed Propulsion Phase I—Quarterly Progress Report No. 4", Georgia Tech Research Institute, Oct. 30, 2007, 10 pp.

Chan, "Scaling Considerations for Small Aircraft Engines," Department of Aeronautics and Astronautics, Massachusetts Institute of Technology, Jun. 2008, 84 pp.

Kim, "Distributed Propulsion Vehicles," 27th International Congress of the Aeronautical Sciences, Sep. 19, 2010, 11 pp.

Felder et al., "Turboelectric Distributed Propulsion Engine Cycle Analysis for Hybrid-Wing-Body Aircraft," NASA Glenn Research Center, Jan. 2009, 25 pp.

Extended Search Report from counterpart European Application No. 18155560.8, dated Mar. 21, 2018, 8 pp.

Response to the Extended Search Report from counterpart European Application No. 18155560.8, dated Mar. 21, 2018, filed Feb. 26, 2019, 68 pp.

* cited by examiner

DISTRIBUTED PROPULSION SYSTEM POWER UNIT CONTROL

TECHNICAL FIELD

The disclosure relates to systems and techniques for controlling distributed propulsion systems.

BACKGROUND

Distributed propulsion systems are vehicle propulsion systems in which one or more power units drive one or more propulsors that are distributed about the vehicle and provide all or a portion of the overall propulsive force for the vehicle. Distributed propulsion systems may be used on any type of vehicle capable of being driven by propulsors, including aircraft, land craft, or a marine craft.

SUMMARY

In some examples, the disclosure describes a propulsion system that includes a plurality of power units, a plurality of propulsors, where respective power units of the plurality of power units are controllably coupled to the plurality of propulsors, and a controller configured to receive a desired throttle value corresponding to a desired propulsive force, determine a number of power units of the plurality of power units to be coupled to the plurality of propulsors to achieve the desired propulsive force based on a respective power value associated with each respective power unit of the plurality of power units, and cause the number of power units of the plurality of power units to be coupled to the plurality of propulsors.

In some examples, the disclosure describes a method that includes receiving a desired throttle value of a plurality of power units of a propulsion system corresponding to a desired propulsive force of a plurality of propulsors of the propulsion system, determining a number of power units of the plurality of power units to be coupled to the plurality of propulsors to achieve the desired propulsive force based on a respective power value associated with each respective power unit of the plurality of power units, and causing the number of power units of the plurality of power units to be coupled to the plurality of propulsors.

In some examples, the disclosure describes a controller configured to receive a desired throttle value corresponding to a desired propulsive force of a plurality of propulsors of a propulsion system, determine a number of power units of a plurality of power units to be coupled to the plurality of propulsors to achieve the desired propulsive force based on a respective power value associated with each respective power unit of the plurality of power units, and cause the number of power units of the plurality of power units to be coupled to the plurality of propulsors.

The details of one or more examples are set forth in the accompanying drawings and the description below. Other features, objects, and advantages will be apparent from the description and drawings, and from the claims.

DETAILED DESCRIPTION

Figure 1:
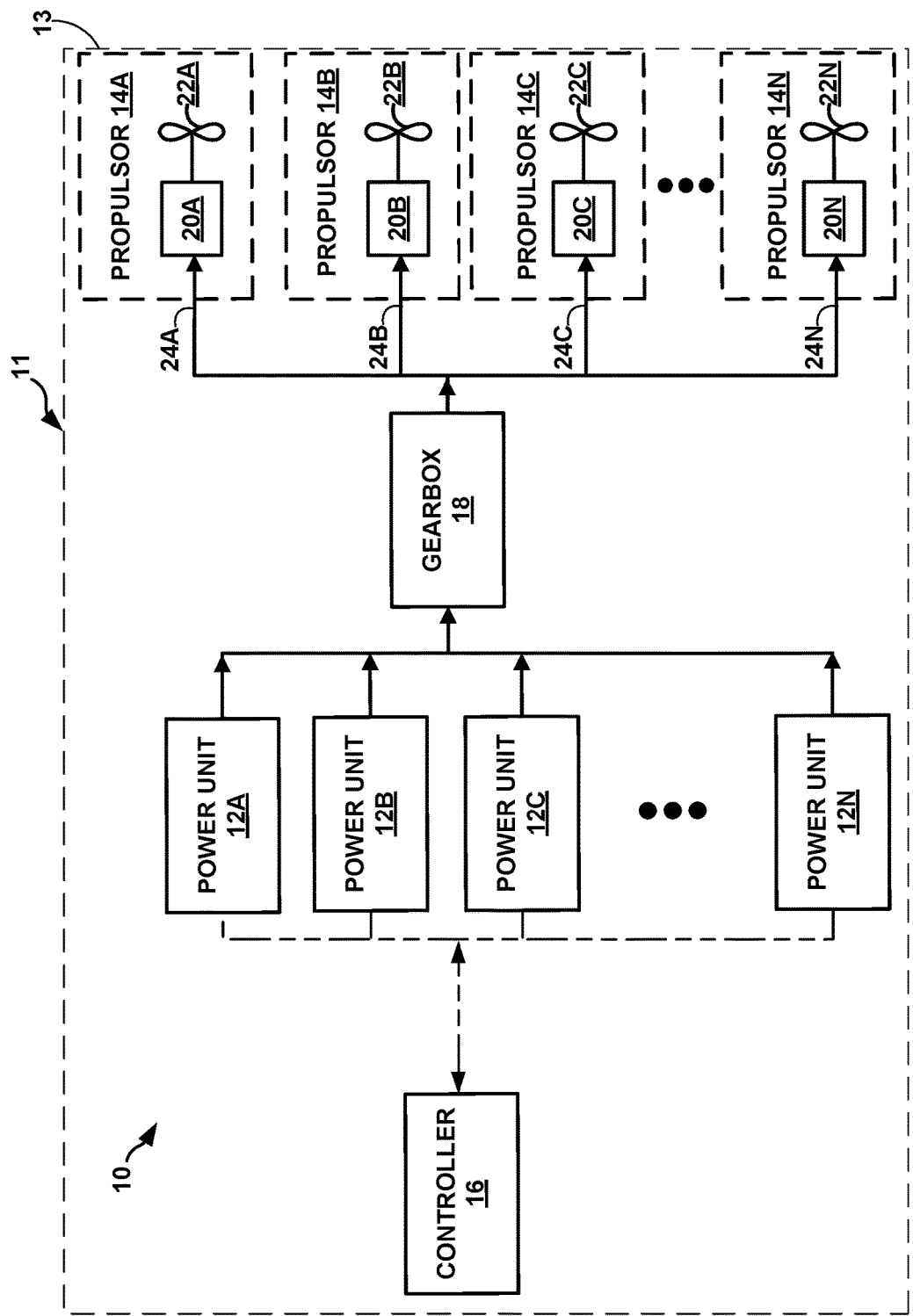
FIG. 1 is a conceptual and schematic block diagram illustrating an example propulsion system that includes a plurality of power units selectively mechanically coupled to a plurality of propulsors by a gearbox and a controller configured to control the operation of the plurality of power units.

The disclosure describes systems and techniques for controlling a distributed propulsion system. A distributed propulsion system may include, for example, a controller and a plurality power units selectively and controllably coupled to a plurality of propulsors. The controller may be configured to selectively control the operation of the plurality of power units. For example, the controller may receive a desired throttle value corresponding to a desired propulsive force, determine a number of power units to be coupled to the propulsors to achieve the desired propulsive force, and cause the determined number of power units to be coupled to the propulsors. In this way, the system and techniques of this disclosure may allow one or more power units to be decoupled from the propulsors or disabled when all available power is not required, while maintaining equal distribution of power to the propulsors. As a result, the systems and techniques of the disclosure may allow a respective power unit to operate at higher power and higher efficiency to improve thrust specific fuel consumption compared to propulsion systems without selective control of power units.

Distributed propulsion systems may offer several benefits over other propulsion systems. For example, in the context of aircraft, distributed propulsion systems described herein may allow aircraft to use multiple, relatively compact power units to provide power for applications that may otherwise use larger power class engines, e.g., larger turbofan engines. The multiple, relatively compact power units of a distributed propulsion system may be located apart from the rest of the propulsion system. This may allow control of the observable infrared signature of the high temperature power unit exhaust, or otherwise enable infrared suppression for the propulsion system. Also, locating the power units apart from propulsors may allow the relatively lower temperature propulsor exhaust to be used, for example, in conjunction with high lift devices or other propulsive force vectoring techniques to increase lift during takeoff and landing, or for inflight control of altitude, angular velocity, or the like.

Furthermore, compared to high bypass ratio turbofans with an engine core to propulsor fan ratio be one to one, distributed propulsion systems described herein allow the ratio of engine cores to propulsor fans to be decoupled such that the number of propulsor fans may be increased and the propulsor fan diameter may be reduced without causing a reduction in the effective bypass ratio of the propulsion system. Such systems may provide sufficient propulsive efficiency while allowing relatively compact propulsor fans that may be integrated into the vehicle to reduce drag, reduce observability, allow for boundary layer ingestion, or the like.

In some examples, distributed propulsion systems described herein also may allow for smaller control surfaces. For example, in the context of aircraft, distributing multiple propulsors about the aircraft may reduce the need for large control surfaces (e.g., the vertical tail of the aircraft) that would otherwise be required to counteract the unbalanced propulsive force during failure of, for example, a wing-mounted turbofan engine.

Although described herein with respect to aircraft, the system and techniques of this disclosure may also apply to, and provide benefits for, other types of vehicles, such as, for example, marine vehicles, land vehicles, railed vehicles, or the like.

FIG. 1 is a conceptual and schematic block diagram illustrating an example propulsion system 10 that includes a plurality of power units 12A-12N (collectively, "power units 12") selectively mechanically coupled to a plurality of propulsors 14A-14N (collectively, "propulsors 14") by a gearbox 18 and a controller 16 configured to control the operation of power units 12. Each of respective propulsors 14 includes a respective gear-set of a plurality of gear-sets 20A-20N (collectively, "gear-sets 20") and a respective propulsor fan of a plurality of propulsor fans 22A-22N (collectively, "propulsor fans 22"). In other examples, propulsion system 10 may include additional or fewer components.

Propulsion system 10 may be used to provide propulsive force for a vehicle 11. For example, power units 12 produce mechanical energy to drive propulsors 14. In some examples, power units 12 may be configured to provide power to other vehicle systems, e.g., electrical systems, hydraulic systems, or mechanical systems. In this way, propulsion system 10 may be used to propel and operate vehicle 11.

Power units 12 may include any suitable type of power unit. For example, power units 12 may include gas turbines, internal combustion engines, or the like. In some examples, power units 12 may include a single type of power unit. For example, all power units 12 may be gas turbines. In other examples, power units 12 may include two or more types of power units. For example, power units 12 may include one or more gas turbines and one or more internal combustion engines. Selection of the types of power units 12 may depend on the peak power output, power to weight ratio, power unit size, or the like, of the power units.

Power units 12 may include any suitable power output. In some examples, each of power units 12 may have a substantially similar power output. For example, power units 12 may have substantially the same peak power output. In other examples, one or more of power units 12 may have a different power output than another one or more of power units 12. For example, power units 12 may have substantially different peak power outputs. In this way, power units 12 may be selected to provide sufficient power for one or more operations of propulsion system 10. For example, where propulsion system 10 is on an aircraft, power units 12 may be selected such that all or nearly all power units 12 are operated to provide sufficient power for take-off and landing, while less than all power units 12 are operated to provide sufficient power to maintain a cruising speed.

In some examples, during operation of propulsion system 10, at least one power unit of power units 12 may be configured for continuous operation and at least one power unit of power units 12 may be configured for selective operation. In this way, during operation of propulsion system 10, a respective power unit of power units 12 may be selected to operate when the respective power unit will operate at or near a maximum designed power output and/or maximum efficiency (i.e., thermal efficiency, fuel efficiency, and the like). For example, during take-off or landing of an aircraft having propulsion system 10, all or nearly all power units 12 may be selected to operate at or near a maximum designed power output and/or maximum efficiency of each respective power unit of power units 12 to provide a desired propulsive force. As another example, during cruising of an aircraft having propulsion system 10, less than all power units 12 may be selected to operate to provide a desired propulsive force, such that each respective operating power unit of power units 12 may operate at or near a maximum designed power output and/or maximum efficiency of each respective operating power unit of power units 12. In this way, a respective power unit of power units 12 may be selected to operate when the selectively operated power units may operate at or near a maximum designed power output and/or maximum efficiency.

In some examples, the power output of the respective power units 12, the number of power units 12, and the configuration for continuous or selective operations may be selected together. For example, propulsion system 10 may include four power units 12. Two of the power units 12 may be configured for continuous operation, e.g., during movement of vehicle 11 to which propulsion system 10 is attached. As such, in the example of an aircraft, the two power units 12 configured for continuous operation may be sized so that the power output of the two power units 12 is sufficient to provide substantially all power utilized by vehicle 11 during cruising. The other two power units of power units 12 may be configured for selective operation and may be sized so that the combined power output of the four power units 12 is sufficient for all operating regimes, e.g., including high power usage scenarios, such as takeoff, emergency maneuvers, or the like.

Gearbox 18 may be mechanically coupled to each power unit of power units 12 to transfer mechanical energy from power units 12 to gearbox 18. For example, each of power units 12 may include a respective power-shaft configured to transfer rotational mechanical energy produced by each of power units 12 to gearbox 18. In some examples, a respective power-shaft of a respective power unit of power units 12 may be directly mechanically coupled to gearbox 18. In other examples, the power-shaft of two or more power units 12 may be mechanically coupled to one or more drive-shafts, where the drive-shaft is directly mechanically coupled to gearbox 18. In other examples, a respective power-shaft of a respective power unit of power units 12 may be directly mechanically coupled to an intermediate gearbox, the intermediate gearbox being mechanically coupled to gearbox 18. In this way, a plurality of power units 12 may be mechanically coupled to gearbox 18 to transfer mechanical energy from power unit 12 to gearbox 18.

In some examples, a respective power-shaft of a respective power unit of power units 12 may include or be coupled to a clutch configured to couple and decouple the respective power unit from gearbox 18, a drive-shaft, intermediate gearbox, or the like. The clutch may include any suitable clutch or clutch system, such as, for example, a friction clutch, a centrifugal clutch, a hydraulic clutch, an electromagnetic clutch, a synchro-self-shifting clutch, or the like. For example, a respective power-shaft of a respective power unit of power units 12 may include a sprag clutch that engages when the respective power unit is operating to transfer mechanical energy from a respective power unit to gearbox 18. When the respective power unit is not operating, the sprag clutch may disengage, such that mechanical energy is not transferred from gearbox 18 back to the respective power unit.

Propulsors 14 provide propulsive force for propulsion system 10. Propulsors 14 may include, for example, gear-sets 20A-20N (hereinafter, "gear-sets 20"), fans 22A-22N (hereinafter, "fans 22"), shrouds, high-lift devices, or the like. Though propulsors 14 are described herein as including fans 22, propulsors 14 may include any suitable type of propulsors, such as, for example, fans, propellers, rotor-stator assemblies, and the like.

In some examples, propulsors 14 may be configured to provide sufficient propulsive efficiency while being relatively compact. This may allow propulsors 14 to be integrated into vehicle 11 in ways that reduce drag, reduce observability, allow for boundary layer ingestion (e.g., ingestion of fluid at a fluid boundary layer formed at an outer surface 13 of vehicle 11 to which propulsors 14 are attached), or the like. In this way, propulsion system 10 may allow for smaller control surfaces on, for example, an aircraft, because distributing multiple propulsors about the vehicle may reduce the need for large control surfaces (e.g., the vertical tail of the aircraft) that would otherwise be utilized to counteract the unbalanced propulsive force during failure of a non-distributed propulsion type engine (e.g., a wing-mounted engine of an aircraft propulsion system).

Propulsors 14 may be mechanically coupled to gearbox 18 to transfer mechanical energy from power units 12 to propulsors 14. For example, each of propulsors 14 may include a respective drive-shaft 24A-24N (collectively, draft-shafts 24) configured to transfer rotational mechanical energy from gearbox 18 to a respective propulsor of propulsors 14. In some examples, a respective drive-shaft of drive-shafts 24 of a respective propulsor of propulsors 14 may be directly mechanically coupled to gearbox 18. In other examples, the drive-shafts 24 of two or more of propulsors 14 may be mechanically coupled to an intermediate drive-shaft, where the intermediate drive-shaft may be directly mechanically coupled to gearbox 18. In some examples, a respective propulsor of propulsors 14 may be mechanically coupled to a respective gear-set of gear-sets 20 by a respective drive-shaft of drive-shafts 24, each respective gear-set of gear-sets 20 being mechanically coupled to gearbox 18. In this way, a plurality of propulsors 14 may be mechanically coupled to gearbox 18 to transfer mechanical energy from power unit 12 to propulsors 14 such that propulsors 14 may provide propulsive force for propulsion system 10. In some examples, gear-sets 20 may include one or more gear ratios such that, for a given revolution per minute (RPM) output from gearbox, one or more propulsors may rotate at a first RPM and another one or more propulsors may rotate at a second RPM. In this way, a plurality of propulsors 14 may include a first sets of propulsors of the plurality of propulsors 14 that operate at a first RPM and a second sets of propulsors of the plurality of propulsors 14 that operate at a second RPM.

Controller 16 may be configured to control an operation of each power unit of power units 12. Controller 16 may comprise any suitable arrangement of hardware, software, firmware, or any combination thereof, to perform the techniques attributed to controller 16 herein. Examples of controller 16 include any one or more microprocessors, digital signal processors (DSPs), application specific integrated circuits (ASICs), field programmable gate arrays (FPGAs), or any other equivalent integrated or discrete logic circuitry, as well as any combinations of such components. In examples in which controller 16 includes software or firmware, controller 16 further includes any necessary hardware for storing and executing the software or firmware, such as one or more processors or processing units. In general, a processing unit may include one or more microprocessors, DSPs, ASICs, FPGAs, or any other equivalent integrated or discrete logic circuitry, as well as any combinations of such components.

Controller 16 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to controller 16 (e.g., may be external to a package in which controller 16 is housed). Although controller 16 is generally described as being the primary unit for controlling each of power units 12 for performing the techniques described herein, in some examples, the individual components propulsion system 10 may include additional functionality for performing some or all the operations described herein with respect to controller 16.

Controller 16 may control coupling and decoupling of a respective power unit of power units 12 to propulsors 14, enabling and disabling the operation of a respective power unit of power units 12, or the like. Coupling or decoupling of a respective power unit of power units 12 to propulsors 14 may include, for example, physically connecting or disconnecting a respective power unit of power units 12 to gearbox 18 by a clutch, as described above. Enabling or disabling a respective power unit of power units 12 may include, for example, controlling a fuel supply to a respective power unit. For example, enabling a respective power unit of power units 12 may including allowing or starting fuel to the respective power unit, while disabling a respective power unit of power units 12 may include restricting or stopping fuel flow to the respective power unit. In examples in which controller 16 may enable or disable power units 12, each of power units 12 may include a clutch, such as, for example, a sprag clutch that engages (couples) when a respective power units of power units 12 is enabled, or disengages (decouples) when a respective power unit of power units 12 is disabled. In this way, controller 16 may selectively control an operation of each power unit of power units 12 by coupling and decoupling and/or enabling and disabling a respective power unit of power units 12.

Controller 16 may selectively control an operation of each power unit of power units 12 based on, for example, a signal indicating a desired throttle value corresponding to a desired propulsive force. The desired throttle value may be an output from a vehicle system, e.g., a flight system of an aircraft. Controller 16 may determine a desired propulsive force based on the desired throttle value, e.g., using an equation or other relationship, a look-up table, another data structure, or the like. After determining the desired propulsive force, controller 16 may determine a number of power units 12 to be coupled to propulsors 14 to achieve the desired propulsive force based on a respective power value associated with each respective power unit of power units 12. After determining the number of power units 12 to be coupled to propulsors 14, controller 16 may cause the number of power units 12 to be coupled to propulsors 14.

For example, after determining a maximum available propulsive force based on a number of currently operating power units of power units 12 and a maximum designed power of each respective currently operating power unit of power units 12, controller 16 may determine that the maximum available propulsive force is less than the desired propulsive force. In some such examples, controller 16 subsequently may cause at least one additional power unit of power units 12 to be coupled to propulsors 14. In other words, controller 16 may determine that more than the number of currently operating power units of power units 12 may be preferred to provide the desired propulsive force, and couple one or more additional power units 12 to propulsors 14 or enable one or more additional power units 12.

As another example, controller 16 may determine that the desired propulsive force is less than a maximum available propulsive force using all currently engaged power units 12. Controller 16 then may determine a maximum available propulsive force of fewer than all currently operating power units of power units 12, e.g., of a number of power units 12 that is one less than the number of currently operating power units 12. In some examples, controller 16 may determine that the desired propulsive force is less than the maximum available propulsive force for the reduced number of power units 12. In such an example, controller 16 subsequently may cause at least one power unit of the plurality of power units 12 to be decoupled from the plurality of propulsors 14. In other words, controller 16 may determine that fewer than the number of currently operating power units of power units 12 may be utilized to provide the desired propulsive force, and decouple one or more power units 12 from propulsors 14 or disable one or more power units 12.

The maximum available propulsive force ($P_A$) of all currently engaged power units 12 may be based on the number of currently engaged power units 12 ($N_O$), a maximum designed power ($P_M$) of each respective power unit of power units 12, and a power margin (M). For example, the maximum available propulsive force of each respective currently operating power unit of power units 12 may be given by $P_A = (N_O)(P_M)(1-M)$.

In some examples, the maximum designed power ($P_M$) of each respective currently operating power unit of power units 12 may be based on operating conditions of the respective currently operating power units 12 and the power unit health of the respective currently operating power units 12.

The operating conditions may include, for example, the temperature of the power unit or the operating environment, the pressure or altitude of the operating environment, the humidity in the operating environment, or the like. The operating conditions may affect, for example, the density of air in the operating environment and, thereby, affect the maximum available power of power units 12. Using operating conditions to determine a maximum designed propulsive force of a respective power unit may allow more accurate calculation of the maximum available propulsive force of a respective power unit of power units 12.

The power unit health may be a numerical indication used to estimate the maximum available power of a respective power unit of power units 12 over time (e.g., as percentage of the maximum available power of a new power unit). The power unit health may be based on, for example, total lifetime engine run-time, total startup/shutdown cycles, maintenance records, and the like. Using power unit health may allow more accurate calculation of the maximum available power of a respective power unit of power units 12.

The power margin (M) may be factor used to reduce power unit engagement or disengagement near or at the maximum designed power of each respective power unit. The power margin may be based on a fixed minimum power margin value, the magnitude of the desired throttle value, and a rate of change of the desired throttle value. Using power margin may reduce, for example, engine startup/shutdown oscillation.

Figure 2:
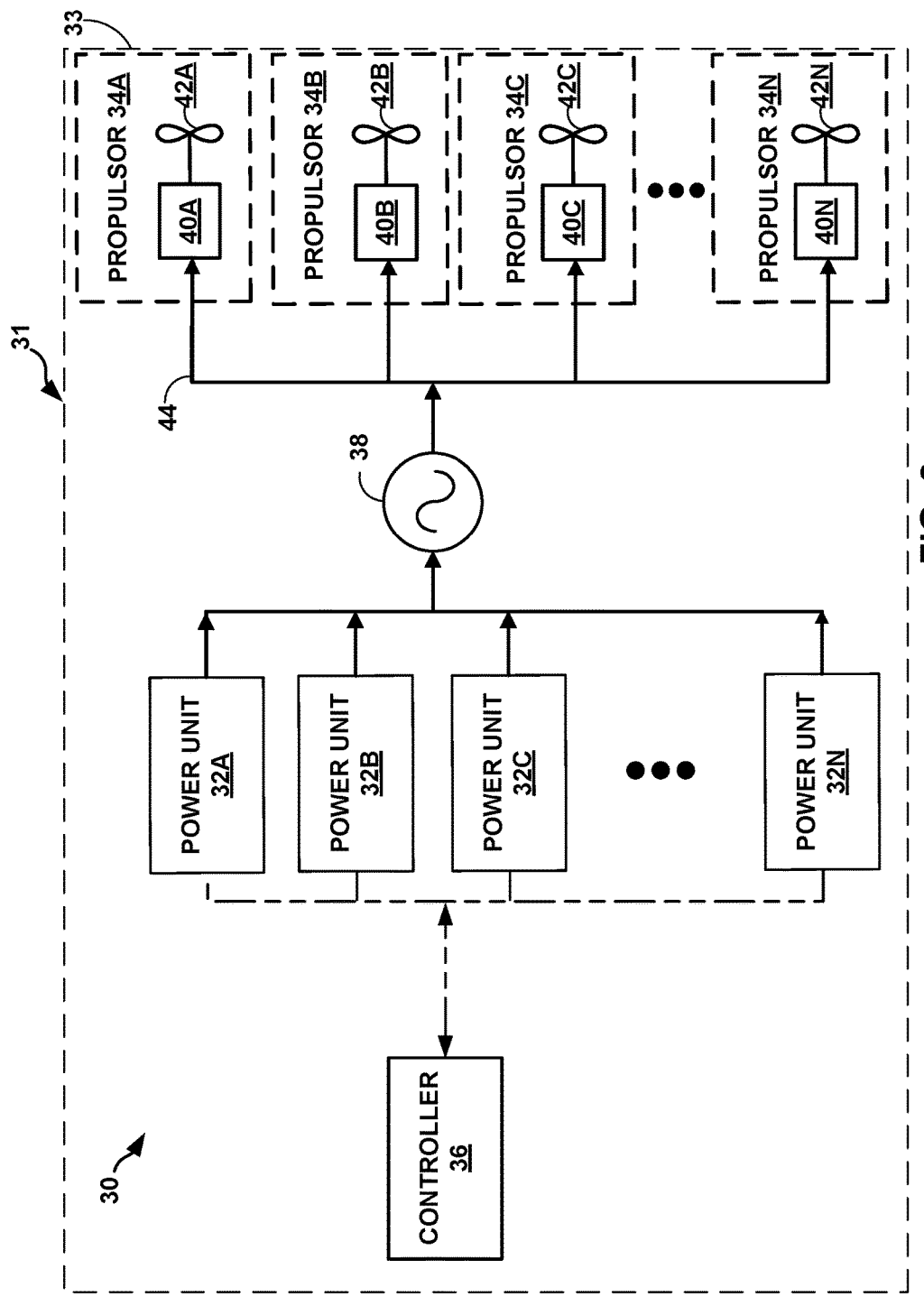
FIG. 2 is a conceptual and schematic block diagram illustrating another example propulsion system that includes a plurality of power units selectively electrically coupled to a plurality of propulsors by a generator and a controller configured to control the operation of the plurality of power units.

FIG. 2 is a conceptual and schematic block diagram illustrating another example propulsion system 30 that includes a plurality of power units 32A-32N (collectively, "power units 32") selectively electrically coupled to a plurality of propulsors 34A-34N (collectively, "propulsors 34") by a generator 38 and a controller 36 configured to control the operation of power units 32. Each of respective propulsors 34 includes a respective motor of a plurality of motors 40A-40N (collectively, "motors 40") and a respective propulsor fan of a plurality of propulsor fans 42A-42N (collectively, "propulsor fans 42"). In other examples, propulsion system 30 may include additional or fewer components.

Each component of propulsion system 30 may be similar to or substantially the same as the corresponding component of propulsion system 10 of FIG. 1, aside from the differences described herein. For example, rather than power units 12 being mechanically coupled to propulsors 14 via gearbox 18 (see FIG. 1), power units 32 of FIG. 2 may be selectively electrically coupled to propulsors 34 by generator 38, motors 40, and an associated electrical bus 44. For example, generator 38 may be operably mechanically coupled to power units 32, and configured to convert the mechanical energy from power units 32 into electrical energy. Motors 40 may be electrically coupled to generator 38, and configured to convert electrical energy from generator 38 into mechanical energy for rotating propulsor fans 42. A respective propulsor fan of propulsor fans 42 is mechanically coupled to a respective motor of motors 40, and configured to convert the mechanical energy from a respective motor of motors 40 into propulsive force for vehicle 31 including propulsion system 30 and outer surface 33.

Generator 38 may be operably mechanically coupled to power units 32, and configured to convert mechanical energy from power units 32 into electrical energy. In some examples, generator 38 may include a plurality of generators operably mechanically coupled to at least one of power units 32. In other examples, generator 38 may include a plurality of generators each operably mechanically coupled to one or more of power units 32. Generator 38 represents any high voltage or high current variable frequency, AC power source for use in an electric propulsion system such as propulsion system 30.

Generator 38 may be driven by at least one of power units 32. For example, where generator 38 includes one generator operably mechanically coupled to each respective power units 32, each of power units 32 may be mechanically coupled to a gearbox (e.g., gearbox 18 of FIG. 1) that is mechanically coupled to generator 18. As another example, where generator 38 includes a plurality of generators operably mechanically coupled to at least one of power units 32, each of power units 32 may be directly mechanically coupled to one generator of the plurality of generators, or a subset of power units 32 may be mechanically coupled to a gearbox that is mechanically coupled to one of the plurality of generators. In some examples, generator 38 may have independent sets of windings which are dedicated to each of propulsor motors 40 (e.g., one respective power unit of power units 32 for each respective propulsor motor of propulsor motors 40) or which are dedicated to subset of propulsor motors 40. In other examples, generator 38 may have a shared set of windings associated with all of propulsor motors 40.

Generator 38 may be configured to provide electrical power to electrical bus 44. Electrical bus 44 may be any suitable electrical bus. For example, electrical bus 44 may be a variable frequency, AC electrical bus. Electrical bus 44 is electrically coupled to propulsor motors 40 and may be configured to distribute, to each of propulsor motors 40, the electrical current derived from the electrical power produced by power units 32 and generator 38. For example, where generator 38 includes one generator operably mechanically coupled to each of power units 32, electrical bus 44 may include a single electrical bus extending from generator 38. As another example, where generator 38 includes a plurality of generators operably mechanically coupled to at least one of power units 32, electrical bus 44 may include a plurality of electrical buses extending from each of the plurality of generators and electrically coupled into a single electrical bus 44.

Each of propulsor motors 40 represents any type of motor for receiving electrical power provided by an electric propulsion system and converting the electrical power to a mechanical motion. As shown in FIG. 2, propulsor motors 40 drive propulsor fans 42. Propulsor motors 40 may include additional sensors and/or feedback circuitry for providing information (e.g., voltage, current, rotational speed, frequency, phase, etc.) back to the components of propulsion system 30, e.g., controller 36, that are used to control power units 32.

Controller 36 may be similar to or substantially the same as controller 16 of FIG. 1. For example, controller 36 may be configured to selectively control an operation of each power unit of power units 32. For example, as discussed above with respect to controller 16 of FIG. 1, controller 36 may control coupling and decoupling of a respective power unit of power units 32 to propulsors 34, enabling and disabling the operation of a respective power unit of power units 32, or the like. Additionally, in examples in which generator 38 includes a plurality of generators each operably mechanically coupled to one or more of power units 32, controller 36 may control an isolation device configured electrically coupled or decouple one of the plurality of generators from electrical bus 44. Isolation devices may include any suitable isolation device to block voltage or interrupt current from one of the plurality of generators, such as, for example, a switch. In this way, controller 36 may selectively control a mechanical coupling of power units 32 to generator 38, a fuel feed to power units 32, or an electrical coupling of a plurality of generators to electrical bus 44 to control an operation of each power unit of power units 32.

Figure 3:
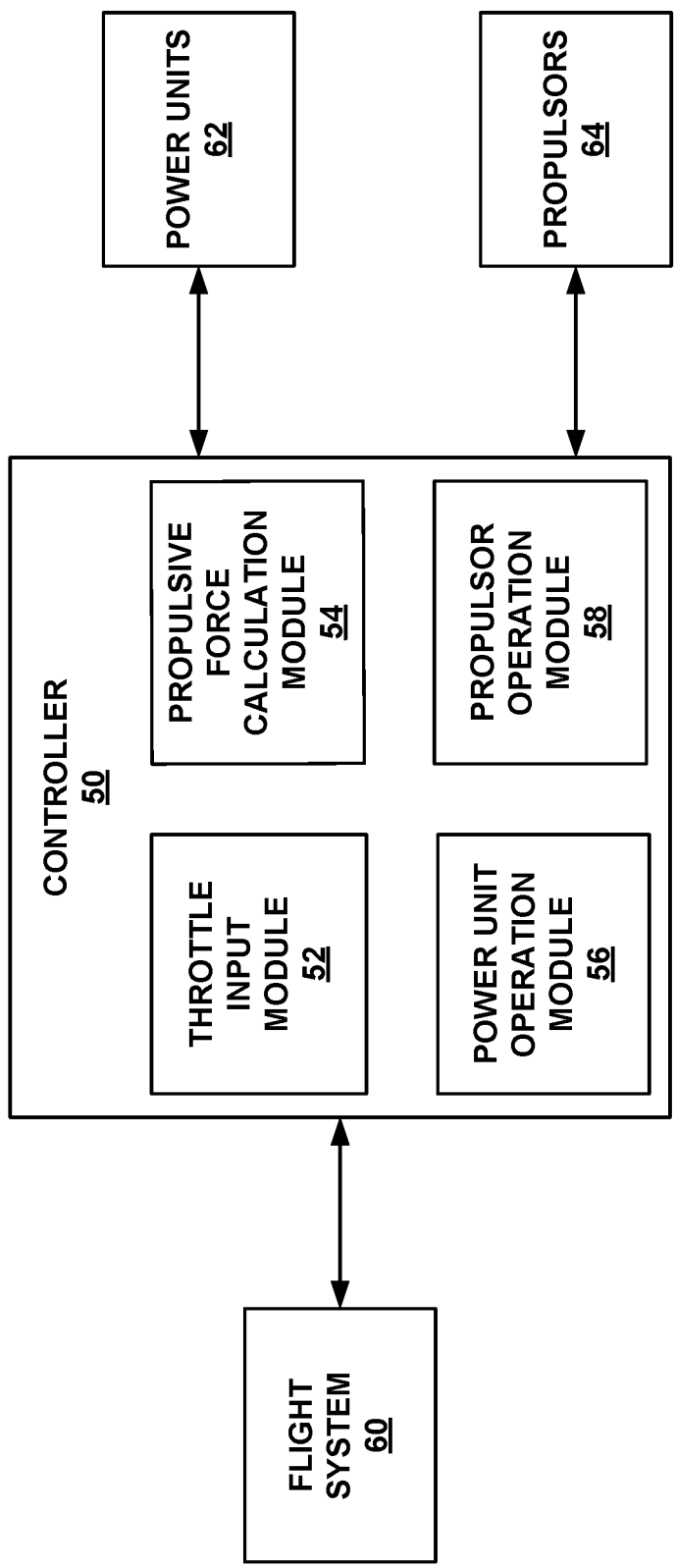
FIG. 3 is a conceptual and schematic block diagram illustrating an example controller of a propulsion system configured to control the operation of a plurality of power units.

FIG. 3 is a conceptual and schematic block diagram illustrating an example controller 50 of a propulsion system configured to control the operation of a plurality of power units. Controller 50 may include throttle input module 52, propulsive force calculation module 54, power unit operation module 56, and propulsor operation module 58. Controller 50 may be communicatively coupled to vehicle control system 60, power units 62, and propulsors 64. Operation of controller 50 is discussed below in reference to FIG. 4, a flow diagram illustrating an example technique for controlling the operation of a plurality of power units of a propulsion system Throttle input module 52 may be configured to receive a desired throttle value and determine a desired propulsive force based on the desired throttle value. Propulsive force calculation module 54 may be configured to receive the desired throttle value from throttle input module 52 and determine a corresponding desired propulsive force. Propulsive force calculation module 54 also may be configured to determine a number of power units 62 to be engaged and/or enabled to produce power for propulsors 64 to achieve the desired propulsive force. Power unit operation module 56 may be configured to receive an indication of the number of power units 62 to be engaged and/or enabled from propulsive force calculation module 54 and control operation of power units 62 based on the indication.

Propulsor operation module 58 is configured to control operation of propulsors 64, e.g., in examples in which propulsors 64 include controllable aspects. Controllable aspects of propulsors 64 may include, for example, variable pitch blades, variable rotational speeds (e.g., gearing) with respect to gearbox 18 (FIG. 1) or generator 38 (FIG. 2), selective enabling or disabling, or the like. Propulsor operation module 58 is optional and may not be included in all examples of controller 50.

Vehicle control system 60 may include a higher-level control system that controls overall operation of a vehicle in which controller 50 is implemented. For example, vehicle control system 60 may be a control system of an aircraft, a marine vehicle, a land vehicle, or the like. Power units 62 and propulsors 64 may be similar to or substantially the same as power units 12 and 32 and propulsors 14 and 34, respectively, shown in FIGS. 1 and 2.

Figure 4:
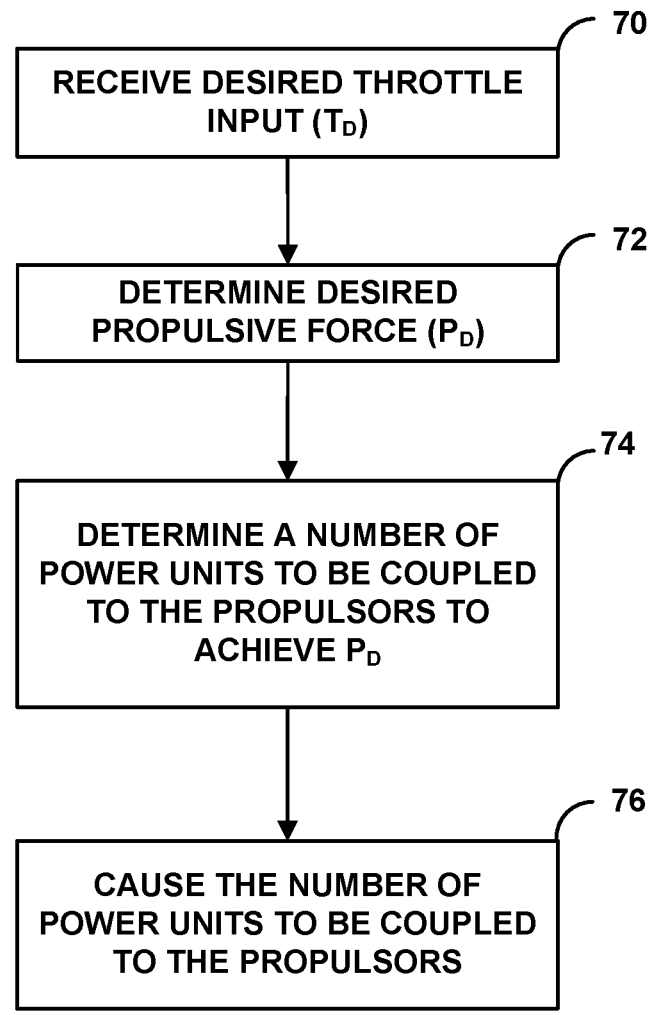
FIG. 4 is a flow diagram illustrating an example technique for controlling the operation of a plurality of power units of a propulsion system.

In operation, and with reference to FIG. 4, controller 50, e.g., throttle input module 52, may receive a desired throttle value ($T_D$) (70). The desired throttle value may be an output from a vehicle system. For example, a desired throttle value may be output from an aircraft flight system 60. Throttle input module 52 may receive the desired throttle value as signal, e.g., an analog signal, a digital signal, an optical signal, or the like.

Throttle input module 52 may be communicatively coupled to propulsive force calculation module 54. For example, propulsive force calculation module 54 may be configured to receive the desired throttle value from throttle input module 52 and determine a desired propulsive force value ($P_D$) based on the desired throttle value (72). In some examples, propulsive force calculation module 54 may be configured to determine the desired propulsive force value using an equation, a numerical method, a look-up table, another data structure, or the like, which relates respective desired throttle values to respective desired propulsive force values.

Propulsive force calculation module 54 also may be configured to determine a number of power units 62 to be coupled to propulsors 64 to achieve the desired propulsive force based on the desired propulsive force value (74). For example, propulsive force calculation module 54 may be configured to determine or retrieve a maximum available propulsive force based on a number of currently operating power units 62. For example, if a propulsion system includes three power units 62, propulsive force calculation module 54 may be configured to determine propulsive force values corresponding to the seven possible combinations of power unit operation. Propulsive force calculation module 54 may be configured to determine the propulsive force values using an equation, a numerical method, a look-up table, another data structure, or the like, which relates numbers of enabled power units to propulsive force values.

Also, propulsive force calculation module 54 may be configured to receive, e.g., from power units 62 or flight system 60, an indication of the number of currently operating power units 62. The indication may identify which of a plurality of power units 62 are operating. The indication may be stored by propulsive force calculation module 54 or controller 50 until a time that the number of operating power units 62 changes. In this way, controller 50 may receive an indication of a number of currently operating power units ($N_O$) and determine a standard propulsive force for a given arrangement of operating power units.

In some examples, propulsive force calculation module 54 optionally may be configured to receive, from power units 62 or flight system 60, an indication of the operating conditions associated with power units 62, the power unit health associated with respective ones of power units 62, and/or a power margin associated with power units 62. The operating conditions may include, for example, the temperature of the power unit or the operating environment, the pressure or altitude of the operating environment, the humidity in the operating environment, or the like. The operating conditions may affect, for example, the density of air in the operating environment and, thereby, affect the maximum available power of power units 62. Using operating conditions to determine a maximum designed power may allow more accurate calculation of the maximum available power of a respective power unit of power units 62.

The power unit health may be a numerical indication used to estimate the maximum available power of a respective power unit of power units 62 over time (e.g., as percentage of the maximum available power of a new power unit). The power unit health may be based on, for example, total lifetime engine run-time, total startup/shutdown cycles, maintenance records, and the like. Using power unit health may allow more accurate calculation of the maximum available power of a respective power unit of power units 62.

The power margin may be based on a fixed minimum power margin value, the magnitude of the desired throttle value, and a rate of change of the desired throttle value. Using power margin may reduce, for example, power unit startup/shutdown oscillation.

Propulsive force calculation module 54 may determine the desired propulsive force provided by each respective power unit as a function of at least one of the desired propulsive force value, the operating conditions and power unit health of currently operating power units, and the power margin of the currently operating power units. In this way, propulsive force calculation module may use the operating conditions, power unit health, and power margin of each of power units 62 to more accurately determine the desired propulsive force provided by each of power units 62.

Propulsive force calculation module 54 may be configured to determine a maximum available propulsive force of a current configuration of the propulsion system, e.g., based on the currently operating power units. In addition, in some examples, propulsive force calculation module 54 may be configured to determine a maximum propulsive force provided by a number of power units that is one less than the number of currently operating power units, determine a maximum propulsive force provided by a number of power units that is one more than the number of currently operating power units, or determine a maximum propulsive force provided by a number of power units that is any number more or less than the number of currently operating power units. For example, the standard propulsive force values as described above may include a maximum propulsive force value, i.e., the maximum propulsive force for each of a number of operating power units. A number of operating power units may be selected based on the direction, magnitude, and rate of the change in throttle. For example, a relatively fast increase to near full throttle (e.g., from 50% to near 100% throttle) may cause all power units to be selected. As another example, a relatively slow decrease in throttle (e.g., from 50% to 40%) may cause a power unit of relatively smaller power to be deselected.

Propulsive force calculation module 54 may compare the desired propulsive force and the maximum available propulsive force for a selected number of power units 62 to determine whether to engage or disengage one or more power units 62 to achieve the desired propulsive force. For example, during throttle increase, after determining a maximum available propulsive force, propulsive force calculation module 54 may determine that the maximum available propulsive force for the currently operating power units is less than the desired propulsive force. In other words, propulsive force calculation module 54 may determine that more than the number of currently operating power units of power units 12 may be needed to provide the desired propulsive force. As another example, during throttle decrease, after determining a maximum available propulsive force, propulsive force calculation module 54 may determine that the desired propulsive force is less than the maximum available propulsive force. In other words, propulsive force calculation module 54 may determine that fewer than the number of currently operating power units of power units 12 may be preferred to provide the desired propulsive force. In this way, as shown in FIG. 4, controller 50 may determine a number of power units 62 to be coupled or decoupled, enabled or disabled, or otherwise engaged or disengaged to the propulsors 64 to achieve the desired propulsive force (74).

Propulsive force calculation module 54 may be communicatively coupled to power unit operation module 56. Power unit operation module 56 may be configured to coupled and decouple, enable and disable, or otherwise engage and disengage power units 12 from propulsors 14. For example, during throttle increase, after receiving a message from propulsive force calculation module 54 to connect an additional power unit, power unit operation module 56 may cause at least one power unit of power units 62 to be coupled, enabled, or otherwise engaged to provide at least some additional power to propulsors 64. As another example, during throttle decrease, after determining that the desired propulsive force is less than the maximum available propulsive force for a number of power units 62 that is one less than the number of currently operating power units 62, power unit operation module 56 may cause at least one power unit of the plurality of power units 62 to be decoupled, disabled, or otherwise disengaged to remove at least some power from propulsors 64. In this way, as shown in FIG. 4, controller 50, e.g., power unit operation module 56, may cause a number of power units 62 to be coupled or decoupled, enabled or disabled, or otherwise engaged or disengaged to the propulsors 64 (76).

Figure 5:
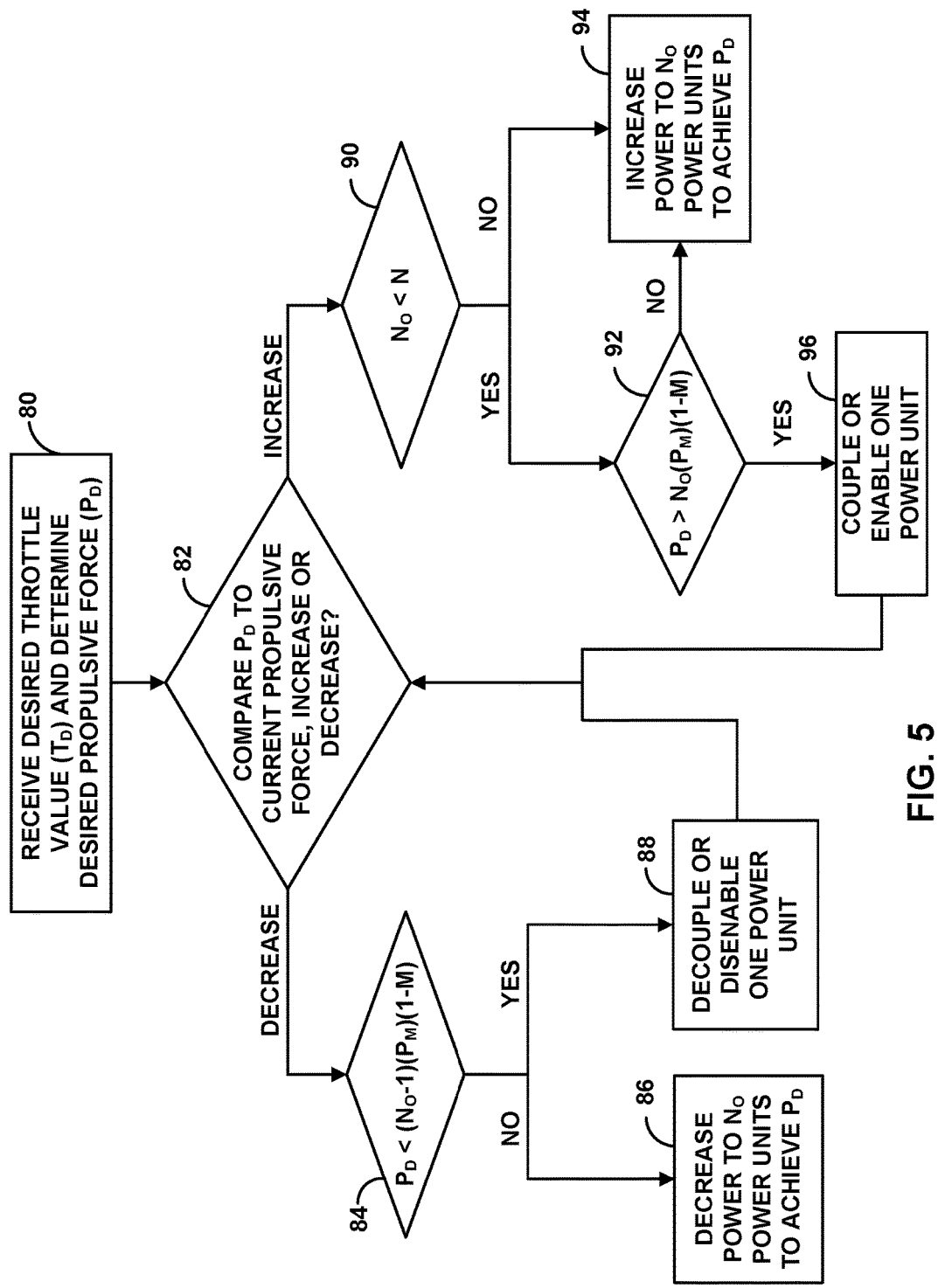
FIG. 5 is a flow diagram illustrating another example technique for controlling the operation of a plurality of power units of a propulsion system.

FIG. 5 is a flow diagram illustrating another example technique for controlling the operation of a plurality of power units of a propulsion system. The example technique is described with respect to propulsion system 10 of FIG. 1 including controller 16, although other components, such as controller 36 of FIG. 2 or controller 50 of FIG. 3, may perform similar techniques.

The technique of FIG. 5 includes receiving, by controller 16, a desired throttle value ($T_D$) and determining a desired propulsive force value ($P_D$) (80). Controller 16 may receive the desired throttle value, for example, from the flight system of an aircraft. Optionally, the technique may include receiving, by controller 16, an indication of a number of currently operating power units 12 ($N_O$). The indication of a number of currently operating power units 12 may be received by controller 16 before, after, or simultaneously with the desired throttle value. For example, controller 16 may be configured to accessibly store in a memory of controller 16 the indication of the number of currently operation power units 12, and access the indication of the number of currently operating power units 12 when a desired throttle value is received. The desired propulsive force value ($P_D$) is based on the desired throttle value. In some examples, the desired propulsive force may be determined based on an equation, a numerical method, a look-up table, another data structure, or the like, which relates respective desired throttle values to respective desired propulsive force values.

The technique of FIG. 5 also includes comparing, by controller 16, the desired propulsive force value to the current propulsive force value to determine if the desired throttle value is a throttle increase or a throttle decrease (82). In the example of a throttle decrease (DECREASE branch), the technique includes determining, by controller 16, if the desired propulsive force is less than a maximum available propulsive force of the one power unit less than the number of currently operating power units (84). For example, where all $N_O$ power units 12 have the same maximum designed power, $P_M$, as a function of operating conditions and power unit health, and the same power margin, M, the following inequality may represent this determination: $P_D<(N_O-1)(P_M)(1-M)$. Where $N_O$ power units 12 have dissimilar $P_M$ and/or M, the right side of the inequality may include a sum of the product of $P_M$ and M for each of power units 12. If the inequality is true (YES branch), then the technique includes causing, by controller 16, one power unit to be decoupled, disabled, or otherwise disengaged (88), and repeating step 82. If the inequality is false (NO branch), then the technique includes causing, by controller 16, a decrease in power to $N_O$ power units 12 (e.g., decrease fuel flow to all power units 12) to achieve desired propulsive force.

In the example of a throttle increase (INCREASE branch), the technique includes determining whether the number of currently operating power units ($N_O$) of power units 12 is less than the total number of available power units (N) of power units 12. If the number of currently operating power units ($N_O$) of power units 12 is not less than the total number of available power units (N) of power units 12 (i.e., all available power units of power units 12 are currently operating) (NO branch), then the technique includes causing, by controller 16, an increase in power to all $N=N_O$ power units 12 (e.g., increase fuel flow to all power units 12) to achieve desired propulsive force. If the number of currently operating power units ($N_O$) of power units 12 is less than the total number of available power units (N) of power units 12 (YES branch), then the technique includes determining, by controller 16, if the desired propulsive force is greater than a maximum available propulsive force of the currently operating power units (92). For example, where all $N_O$ power units 12 have the same maximum designed power, $P_M$, as a function of operating conditions and power unit health, and the same power margin, M, the following inequality may represent this determination: $P_D>(N_O)(P_M)(1-M)$. Where $N_O$ power units 12 have dissimilar $P_M$ and/or M, the right side of the inequality may include a sum of the product of $P_M$ and M for each of power units 12. If the inequality is true (YES branch), then the technique includes causing, by controller 16, one power unit to be coupled, enabled, or otherwise engaged (96), and repeating step 82. If the inequality is false (NO branch), then the technique includes causing, by controller 16, an increase in power to all $N_O$ power units 12 (e.g., increase fuel flow to all power units 12) to achieve desired propulsive force.

Figure 6:
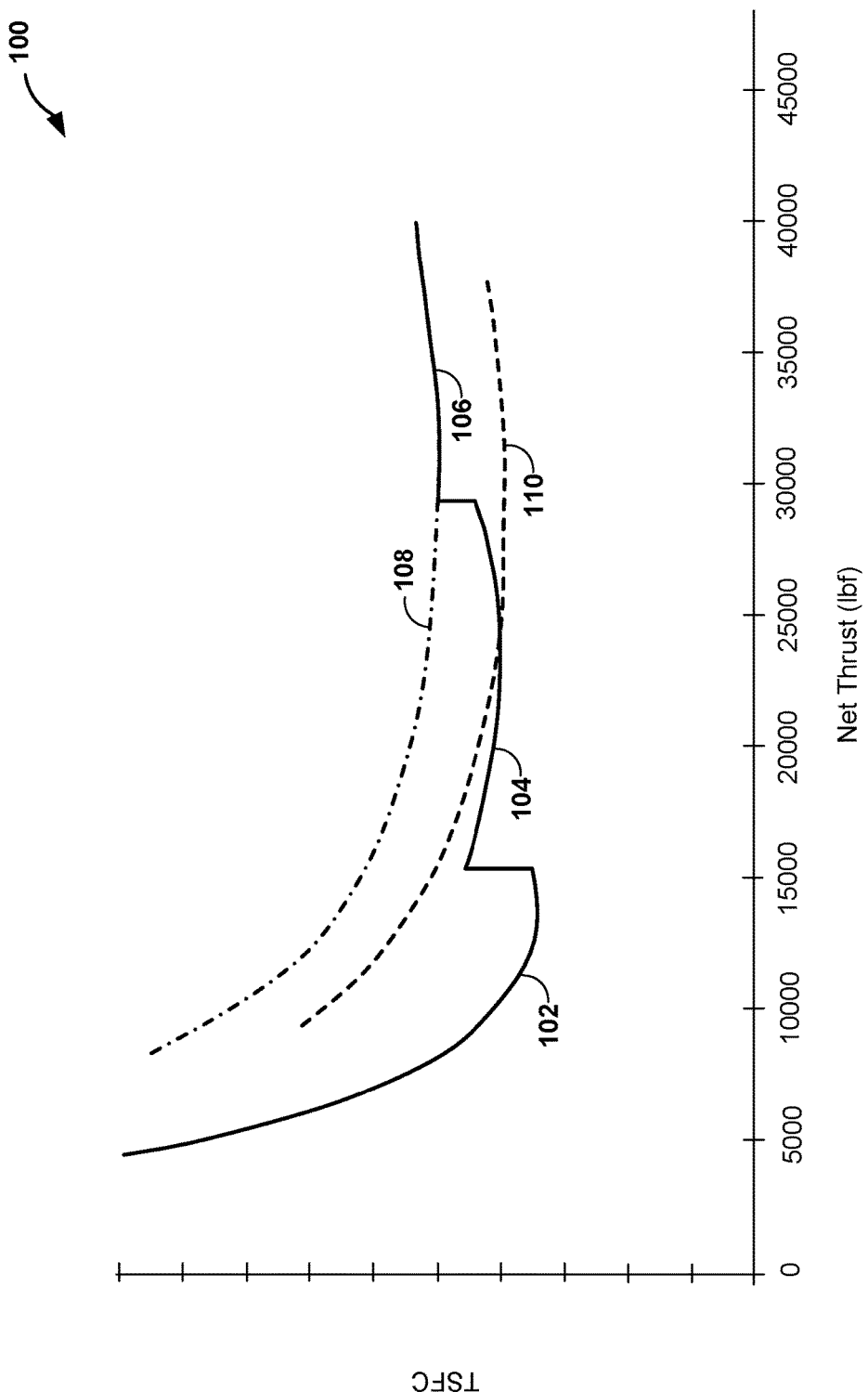
FIG. 6 is a plot of net thrust versus thrust specific fuel consumption comparing throttle hooks for an example distributed propulsion system with two of four, three of four, and four of four operating power units with a throttle hook of a high bypass turbofan.

FIG. 6 is a plot 100 of net thrust versus thrust specific fuel consumption (TSFC) comparing throttle hooks for an example distributed propulsion system with two of four, three of four, and four of four operating power units with a throttle hook of a high bypass turbofan. As illustrated by FIG. 6, a technique for operating a distributed propulsion system with four power units may include controlling the operation of power units to follow curves 102, 104, and 106, as indicated by the solid line. For example, curve 102 shows a portion of the throttle hook for a distributed propulsion system with multiple power units with two of four operating power units, curve 104 shows a portion of the throttle hook for a distributed propulsion system with three of four operating power units, and curve 106 shows a portion of the throttle hook for a distributed propulsion system with four of four operating power units. Together, curves 106 and 108 show a larger portion of the throttle hook for a distributed propulsion system with four of four operating power units. Curve 106 shows the range of net thrust in which the distributed propulsion system may operate most efficiently with four of four operating power units (e.g., as compared to three of four, or two of four, operating power units). Curve 108 shows the range of net thrust in which the distributed propulsion system with four of four operating power units may operate less efficiently than, for example, operating three of four power units or two of four power units.

Curve 110 show the throttle hook for an example large geared, high bypass turbofan. As compared to the distributed propulsion system of curves 102, 104, and 106, the high bypass turbofan may have a lower TSFC at higher net thrust values (e.g., at Net Thrust values greater than about 24,000 pound-force (lbf), where curve 110 crosses curve 104). As compared to the high bypass turbofan, the distributed propulsion system may have a lower TSFC at lower net thrust values (e.g., at Net Thrust values lower than about 24,000 lbf, where curve 110 crosses curve 104). For example, the distributed propulsion system as shown in FIG. 6 may have a more than ten percent TSFC improvement as compared to the high bypass turbofan at a net thrust value of about 11,000 lbf.

Figure 7:
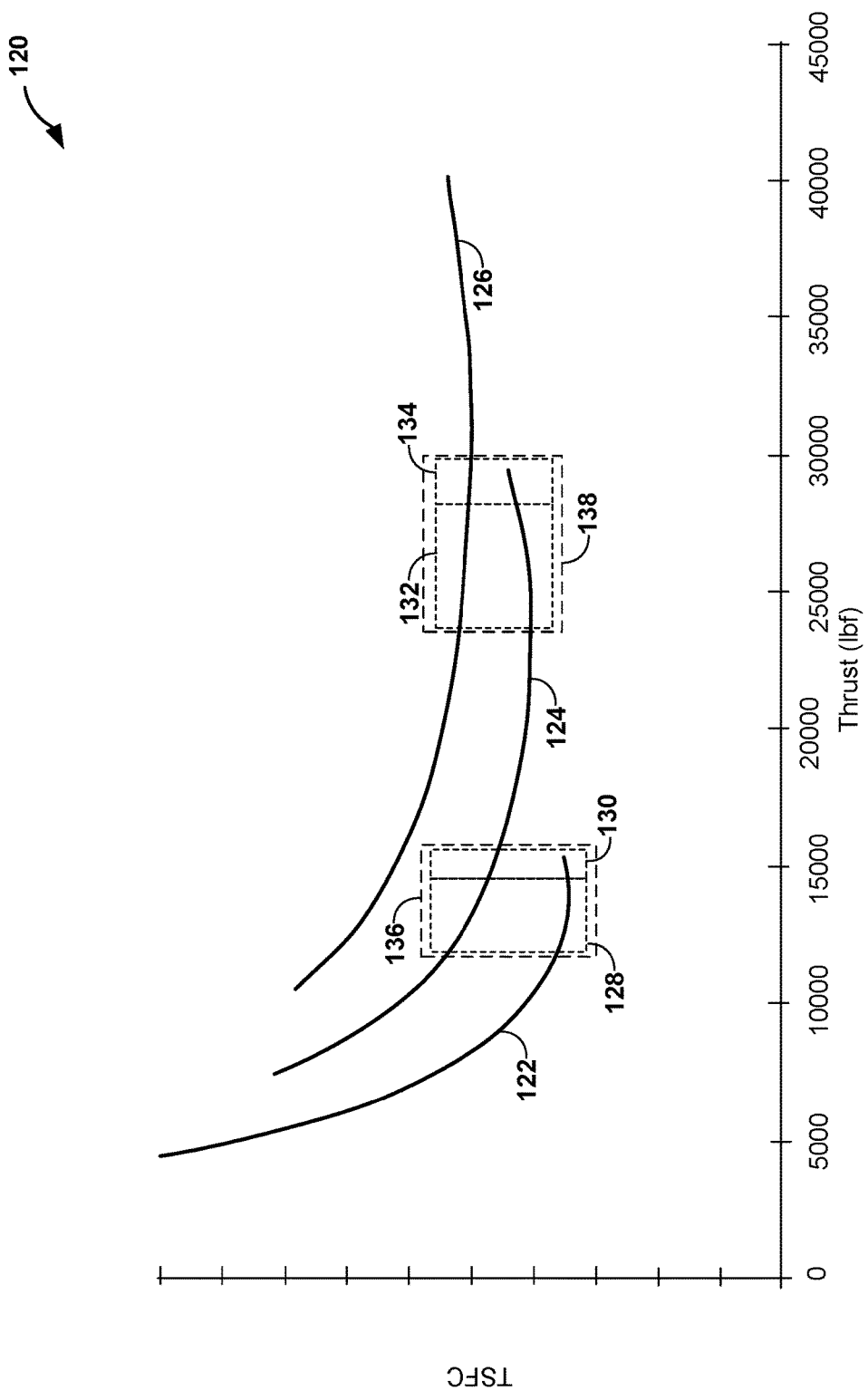
FIG. 7 is a plot of net thrust versus thrust specific fuel consumption for an example distributed propulsion system with two of four, three of four, and four of four operating power units illustrating net thrust ranges in which an operation of a power unit may be selectively controlled to enable or disable a power unit.

FIG. 7 is a plot 120 of net thrust versus TSFC for an example distributed propulsion system with two of four, three of four, and four of four operating power units illustrating net thrust ranges in which an operation of a power unit may be selectively controlled to enable or disable a power unit. Curves 122, 124, and 126 show a portion of the throttle hooks for a distributed propulsion system with two of four, three of four, and four of four operating power units, respectively. As illustrated in FIG. 7, a technique for operating a distributed propulsion system with four power units may include, when controlling the operation of power units, using warning regions 128, 132; decision regions 130, 134; and optional decision regions 136, 138. Warning regions may indicate that a desired propulsive force value is approaching a decision region. A decision region may indicate that one or more additional power units may be necessary to achieve a desired propulsive force value, i.e., one or more power units may be coupled, enabled, or otherwise engaged with propulsors. An optional decision region may indicate that one or more power units are not necessary to achieve a desired propulsive force value, i.e., one or more power units may be decoupled, disabled, or otherwise disengaged from propulsors to allow the operating power units to operate at a higher efficiency.

For example, during throttle increase from an initial net thrust on curve 122 (e.g., 10,000 lbf) to a final net thrust on curve 124 (e.g., 20,000), the net thrust passes through warning region 128 and decision region 130. In some examples, controller 50 may be configured to determine when net thrust enters warning region 128, and cause a warning or other indication to be displayed (e.g., via flight system 60). In some examples, controller 50 may be configured to determine when net thrust enters decision region 130, and controller 50 may, automatically without user input or manually with user input, cause one of power units 52 to be coupled, enabled, or otherwise engaged with propulsors 54. Similarly, for example, during throttle increase from an initial net thrust on curve 124 (e.g., 20,000 lbf) to a final net thrust on curve 126 (e.g., 35,000), the net thrust passes through warning region 128 and decision region 130. In some examples, controller 50 may be configured to determine when net thrust enters warning region 132, controller 50 may cause a warning or other indication to be displayed (e.g., via flight system 60). In some examples, controller 50 may be configured to determine when net thrust enters decision region 134, controller 50 may, automatically without user input or manually with user input, cause one of power units 52 to be coupled, enabled, or otherwise engaged with propulsors 54. In this way controller 50 may provide flight system 60 with a warning before coupling, enabling or otherwise engaging additional power units 52 and allow automatic or manual coupling, enabling or otherwise engaging additional power units 52.

As another example, during throttle decrease from an initial net thrust on curve 126 (e.g., 35,000 lbf) to a final net thrust on curve 124 (e.g., 20,000), the net thrust passes through optional decision region 136. In some examples, controller 50 may be configured to determine when net thrust enters optional decision region 136, and cause a warning or other indication to be displayed (e.g., via flight system 60). In some examples, controller 50 may be configured to determine when net thrust enters optional decision region 136, and automatically without user input or manually with user input cause one of power units 52 to be decoupled, disabled, or otherwise disengaged from propulsors 54. Similarly, for example, during throttle decrease from an initial net thrust on curve 124 (e.g., 20,000 lbf) to a final net thrust on curve 122 (e.g., 10,000), the net thrust passes through optional decision region 138. In some examples, controller 50 may be configured to determine when net thrust enters optional decision region 138, and cause a warning or other indication to be displayed (e.g., via flight system 60). In some examples, controller 50 may be configured to determine when net thrust enters optional decision region 138, and automatically without user input or manually with user input, cause one of power units 52 to be decoupled, disabled, or otherwise disengaged from propulsors 54. In this way controller 50 may provide flight system 60 with a warning before decoupling, disabling or otherwise disengaging one or more power units 52 and/or allow automatic or manual decoupling, disabling or otherwise disengaging one or more power units 52.

The functions described herein may be implemented in hardware, software, firmware, or any combination thereof. If implemented in software, the functions may be stored on or transmitted over, as one or more instructions or code, a computer-readable medium or computer-readable storage device and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media or computer-readable storage device, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood, however, that computer-readable storage media and data storage media do not include connections, carrier waves, signals, or other transient media, but are instead directed to non-transient, tangible storage media. Disk and disc, as used herein, include compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A propulsion system comprising:
a plurality of power units;
a plurality of propulsors, wherein respective power units of the plurality of power units are controllably coupled to the plurality of propulsors; and
a controller configured to:
receive a desired throttle value corresponding to a desired propulsive force;
determine a number of power units of the plurality of power units to be coupled to the plurality of propulsors to achieve the desired propulsive force based on a respective power value associated with each respective power unit of the plurality of power units;
determine a region of net thrust including the desired propulsive force, wherein the region comprises a decision region indicating that at least one additional power unit of the plurality of power units is necessary to achieve the desired propulsive force and a warning region indicating that the desired propulsive force is approaching the decision region; and
cause the number of power units of the plurality of power units to be coupled to the plurality of propulsors responsive to the net thrust entering the decision region.

2. The propulsion system of claim 1, wherein:
the plurality of power units is selectively mechanically coupled to the plurality of propulsors,
the propulsion system further comprises a gearbox and drive-shafts,
each respective power unit of the plurality of power units comprises a respective power-shaft configured to transfer rotational mechanical energy from the respective power unit to the gearbox,
the gearbox is mechanically coupled to the drive-shafts, and
each respective drive-shaft of the drive-shafts is mechanically coupled to a respective propulsor of the plurality of propulsors.

3. The propulsion system of claim 1, wherein:
the propulsion system further comprises a plurality of electric generators selectively coupled to the plurality of power units and a plurality of electric motors coupled to the plurality of propulsors, and
each respective motor of the plurality of motors is configured to convert electrical energy to mechanical energy to drive a respective propulsor of the plurality of propulsors to which the respective motor of the plurality of motors is coupled.

4. The propulsion system of claim 1, wherein the controller is further configured to:
determine a maximum available propulsive force based on a number of currently operating power units of the plurality of power units and a maximum designed power of each respective currently operating power unit of the plurality of power units;
determine that the maximum available propulsive force is less than the desired propulsive force;
determine when net thrust enters the warning region;
cause a warning to be displayed via a flight system responsive to net thrust entering the warning region;
determine when net thrust enters the decision region; and
cause at least one additional power unit of the plurality of power units to be coupled to the plurality of propulsors responsive to the net thrust entering the decision region.

5. The propulsion system of claim 1, wherein the region of net thrust comprises an optional decision region indicating that at least one fewer power unit of the plurality of power units is necessary to achieve the desired propulsive force, and wherein the controller is further configured to:
determine a maximum available propulsive force based on a number of currently operating power units of the plurality of power units less at least one currently operating power units of the plurality of power units and a maximum designed power of each respective currently operating power unit of the plurality of power units;
determine that the desired propulsive force is less than the maximum available propulsive force;
determine when net thrust enters the optional decision region;
cause a warning to be displayed via a flight system responsive to net thrust entering the optional decision region; and
cause at least one power unit of the plurality of power units to be decoupled from the plurality of propulsors responsive to net thrust entering the optional decision region.

6. The propulsion system of claim 1, wherein a maximum designed power of each respective currently operating power unit of the plurality of power units is based on at least one of an operating condition based on at least one of a temperature of each respective currently operating power unit, an ambient pressure, and an ambient humidity, a power unit health of each respective currently operating power unit of the plurality of power units based on at least one of total lifetime engine run-time, total startup/shutdown cycles, and maintenance records, or a power margin based on a fixed minimum power margin value and a rate of change of the desired throttle value.

7. The propulsion system of claim 1, wherein at least one propulsor of the plurality of propulsors is configured to ingest fluid at a fluid boundary layer formed at an outer surface of a vehicle to which the plurality of propulsors are attached.

8. The propulsion system of claim 1, wherein at least one power unit of the plurality of power units is configured for continuous operation and at least one power unit of the plurality of power units is configured for selective operation.

9. A method comprising:
receiving a desired throttle value of a plurality of power units of a propulsion system corresponding to a desired propulsive force of a plurality of propulsors of the propulsion system;
determining a number of power units of the plurality of power units to be coupled to the plurality of propulsors to achieve the desired propulsive force based on a respective power value associated with each respective power unit of the plurality of power units;
determining a region of net thrust including the desired propulsive force, wherein the region comprises a decision region indicating that at least one additional power unit of the plurality of power units is necessary to achieve the desired propulsive force and a warning region indicating that the desired propulsive force is approaching the decision region; and
causing the number of power units of the plurality of power units to be coupled to the plurality of propulsors responsive to the net thrust entering the decision region.

10. The method of claim 9, wherein:
the plurality of power units is selectively mechanically coupled to the plurality of propulsors,
the propulsion system further comprises a gearbox and drive-shaft,
each power unit of the plurality of power units comprises a power-shaft configured to transfer rotational mechanical energy to the gearbox,
the gearbox is mechanically coupled to the drive-shaft, and
the drive-shaft is mechanically coupled to the plurality of propulsors.

11. The method of claim 9, wherein:
the propulsion system further comprises a plurality of electric generators selectively coupled to the plurality of power units and a plurality of electric motors coupled to the plurality of propulsors, and
each respective motor of the plurality of motors is configured to convert electrical energy to mechanical energy to drive a respective propulsor to which the respective motor is coupled.

12. The method of claim 9, further comprising:
determining a maximum available propulsive force based on a number of currently operating power units of the plurality of power units and a maximum designed power of each respective currently operating power unit of the plurality of power units;
determining that the maximum available propulsive force is less than the desired propulsive force;
determining when net thrust enters the warning region;
causing a warning to be displayed via a flight system responsive to net thrust entering the warning region;
determining when net thrust enters the decision region; and
causing at least one additional power unit of the plurality of power units to be coupled to the plurality of propulsors responsive to the net thrust entering the decision region.

13. The method of claim 9, wherein the region of net thrust comprises an optional decision region indicating that at least one fewer power unit of the plurality of power units is necessary to achieve the desired propulsive force, and the method further comprising:
determining a maximum available propulsive force based on a number of currently operating power units of the plurality of power units less at least one currently operating power unit of the plurality of power units and a maximum designed power of each respective currently operating power unit of the plurality of power units;
determining that the desired propulsive force is less than the maximum available propulsive force;
determining when net thrust enters the optional decision region;
causing a warning to be displayed via a flight system responsive to net thrust entering the optional decision region; and
causing at least one power unit of the plurality of power units to be decoupled from the plurality of propulsors responsive to net thrust entering the optional decision region.

14. The method of claim 9, wherein:
a maximum designed power of each respective currently operating power unit of the plurality of power units is based on at least one of an operating condition based on at least one of a temperature of each respective currently operating power unit, an ambient pressure, and an ambient humidity, a power unit health of each respective currently operating power unit of the plurality of power units based on at least one of total lifetime engine run-time, total startup/shutdown cycles, and maintenance records, or a power margin based on a fixed minimum power margin value and a rate of change of the desired throttle value.

15. The method of claim 9, wherein:
during operation of the propulsion system, a fluid boundary layer is formed at an outer surface of a vehicle to which the plurality of propulsors are attached, and
at least one propulsor of the plurality of propulsors is configured to ingest fluid at the fluid boundary layer.

16. The method of claim 9, wherein at least one power unit of the plurality of power units is configured for continuous operation and at least one power unit of the plurality of power units is configured for selective operation.

17. A controller configured to:
receive a desired throttle value corresponding to a desired propulsive force of a plurality of propulsors of a propulsion system;
determine a number of power units of a plurality of power units to be coupled to the plurality of propulsors to achieve the desired propulsive force based on a respective power value associated with each respective power unit of the plurality of power units;
determine a region of net thrust including the desired propulsive force, wherein the region comprises a decision region indicating that at least one additional power unit of the plurality of power units is necessary to achieve the desired propulsive force and a warning region indicating that the desired propulsive force is approaching the decision region; and
cause the number of power units of the plurality of power units to be coupled to the plurality of propulsors responsive to the net thrust entering the decision region.

18. The controller of claim 17, further configured to:
determine a maximum available propulsive force based on a number of currently operating power units of the plurality of power units and a maximum designed power of each respective currently operating power unit of the plurality of power units;
determine that the maximum available propulsive force is less than the desired propulsive force;
determine when net thrust enters the warning region;
cause a warning to be displayed via a flight system responsive to net thrust entering the warning region;
determine when net thrust enters the decision region; and
cause at least one additional power unit of the plurality of power units to be coupled to the plurality of propulsors responsive to the net thrust entering the decision region.

19. The controller of claim 17, wherein the region of net thrust comprises an optional decision region indicating that at least one fewer power unit of the plurality of power units is necessary to achieve the desired propulsive force, and wherein the controller is further configured to:
determine a maximum available propulsive force based on the number of currently operating power units of the plurality of power units less at least one currently operating power units of the plurality of power units and a maximum designed power of each respective currently operating power unit of the plurality of power units;
determine that the desired propulsive force is less than the maximum available propulsive force;

determine when net thrust enters the optional decision region;

cause a warning to be displayed via a flight system responsive to net thrust entering the optional decision region; and cause at least one power unit of the plurality of power units to be decoupled from the plurality of propulsors responsive to net thrust entering the optional decision region.

20. The controller of claim 17, wherein:

a maximum designed power of each respective currently operating power unit of the plurality of power units is based on at least one of an operating condition of each respective currently operating power unit based on at least one of a temperature of each respective currently operating power unit, an ambient pressure, and an ambient humidity, a power unit health of each respective currently operating power unit of the plurality of power units based on at least one of total lifetime engine run-time, total startup/shutdown cycles, and maintenance records, or a power margin based on a fixed minimum power margin value and a rate of change of the desired throttle value.

\* \* \* \* \*